(12) United States Patent  
Kurosawa et al.

(10) Patent No.: US 7,205,982 B1  
(45) Date of Patent: Apr. 17, 2007

(54) CHARACTER INPUT KEYBOARD

(76) Inventors: Hajime Kurosawa, 30-6 Sakae-cho, Itabashi-ku, Tokyo, 173-0015 (JP); Kazuto Takei, 201 Sharuma Denenchofu, 37-5, Denenchofu 5-chome, Ohta-ku, Tokyo, 145-0071 (JP)

( * ) Notice: Subject to any disclaimer, the term of this patent is extended or adjusted under 35 U.S.C. 154(b) by 0 days.

(21) Appl. No.: 09/926,766

(22) PCT Filed: Dec. 24, 1999

(86) PCT No.: PCT/JP99/07279

§ 371 (c)(1),  
(2), (4) Date: May 22, 2002

(87) PCT Pub. No.: WO01/00762

PCT Pub. Date: Feb. 1, 2001

(30) Foreign Application Priority Data

Jul. 26, 1999 (JP) .................................. 11/210363

(51) Int. Cl.  
*G09G 5/00* (2006.01)

(52) U.S. Cl. ........................ 345/168; 345/171

(58) Field of Classification Search ........ 345/168–173; 341/21–26; 400/472–489  
See application file for complete search history.

(56) References Cited

U.S. PATENT DOCUMENTS

| | | | | |
|---|---|---|---|---|
| 3,698,532 A | | 10/1972 | Dodds | ........................ 197/100 |
| 4,613,247 A | | 9/1986 | McGunnigle | ............... 400/486 |
| 4,897,649 A | * | 1/1990 | Stucki | ......................... 341/22 |
| 5,351,066 A | * | 9/1994 | Rucker et al. | ............... 345/168 |
| 5,387,042 A | * | 2/1995 | Brown | ........................ 400/477 |
| 5,503,484 A | * | 4/1996 | Louis | ......................... 400/489 |
| 5,689,253 A | * | 11/1997 | Hargreaves et al. | ........... 341/22 |
| 5,711,624 A | * | 1/1998 | Klauber | ..................... 400/486 |
| 5,784,060 A | * | 7/1998 | Bertram et al. | .............. 345/840 |
| 5,788,386 A | * | 8/1998 | Hayashi et al. | .............. 400/489 |
| 5,790,103 A | * | 8/1998 | Willner | ..................... 345/168 |
| 5,880,685 A | * | 3/1999 | Weeks | ......................... 341/22 |
| 6,005,496 A | * | 12/1999 | Hargreaves et al. | ........... 341/22 |
| 6,237,846 B1 | * | 5/2001 | Lowell et al. | ........... 235/145 R |
| 6,278,497 B1 | * | 8/2001 | Sumiyoshi et al. | .......... 348/722 |
| 6,445,380 B1 | * | 9/2002 | Klein | ......................... 345/168 |
| 6,696,985 B2 | * | 2/2004 | Houston | ....................... 341/21 |

FOREIGN PATENT DOCUMENTS

GB        2 189 195        10/1987

\* cited by examiner

*Primary Examiner*—Vijay Shankar  
(74) *Attorney, Agent, or Firm*—Westerman, Hattori, Daniels & Adrian, LLP.

(57) ABSTRACT

A character input keyboard (20; 20A) of a typewriter style for an electronic information processing apparatus having high frequency in ENTER operation is provided at the right and the left thumbs' home positions for finger operation in front and the center of an operator with a pair of front keys (21, 22) which can be depressed directly by the respective thumb rested thereon as the right and the left thumbs' home positions, one of the centrally juxtaposed right and left front keys (21, 22) being allocated to a front ENTER/RETURN key and the other to a SPACE key as a normal state of the keyboard, whereby direct enter/return operation by either of thumbs rested thereon as thumbs' home positions is physically possible.

3 Claims, 5 Drawing Sheets

(a)

(b)

CHARACTER INPUT KEYBOARD

FIELD OF THE INVENTION

This invention relates to an inputting apparatus of a typewriter style in an electronic information processing apparatus, for example a personal computer, namely a character input keyboard in which characters or letters can be input by typing without sight of the keyboard or by a touch method (that is, touch-typing) with the index fingers, the middle fingers, the third fingers, the little fingers of operator's right and left hands being lightly rested on eight character's or letter's home keys in a middle key array, respectively, and the thumbs of its right and left hands being lightly rested on central portions in a lowermost key array as fingers' home positions for finger operation in touch-typing on the keyboard.

BACKGROUND OF THE INVENTION

In Japan a Japanese keyboard of JIS (Japanese Industrial Standard) kana (so-called Japanese syllabary) key-arrangement is mainly used as a character input keyboard for an electronic information processing apparatus such as a personal computer and the like. As such a Japanese keyboard of JIS kana key-arrangement or a JIS keyboard, a 106/109 Japanese keyboard for IBM's PC/AT compatible machines and a Japanese keyboard for Apple's Macintosh are used in Japan. Further, in addition to such a Japanese keyboard, a 101/104 generic or English keyboard is also used in Japan.

The 109 Japanese keyboard (refer to FIG. 1) and the 104 English keyboard (refer to FIG. 2) are substantially the same as the 106 Japanese keyboard and the 101 English keyboard, respectively, except a few additional function-keys corresponding to WindowsXX (registered trademark) of Microsoft's operating system. Thus as generic terms, "106/109 Japanese keyboard" and "101/104 English keyboard" are herein occasionally employed. Further systems' name and products' name referred herein are the respective companies' trademarks or registered trademarks.

The 106/109 Japanese keyboard, and 101/104 English keyboard are both based on a mechanical European languages' typewriter made in the times when there was no electronic information processing apparatus such as a word-processor, a personal computer and the like, in which characters or letters can be electronically input through a keyboard.

Such a mechanical European languages' typewriter has alphanumeric keys and special character or symbol (or mark) keys wherein alphabet keys in the upper row of the middle key array are sequentially arranged from the left to the right, as per Q, W, E, R, T, Y and so on, which is referred to as ASCII layout or ANSI layout.

The JIS keyboard is diverted from a "kANAMOJI" typewriter designed during the Taisho era in Japan more than seventy years ago when there was no word processor nor personal computer, in which KANAMOJI typewriter katakana characters were allocated to the key layout of the mechanical European languages' typewriter, having the same alphanumeric key-arrangement as that of 101/104 English keyboard but having symbol key-arrangement different therefrom. The term, "KANAMOJI typewriter" used herein should be noted that it means a typewriter designed by KANAMOJIKAI which insisted during the Taisho era in Japan (the beginnings of the 1920's) that the Japanese language should be described only by katakana (so-called the square form of kana in the Japanese syllabary) instead of Chinese characters (kanji).

In the 109 Japanese keyboard 1 as shown in FIG. 1, fifty kana characters are allocated not only to the upper, the central, and the lower rows of the middle key array 3, but also to the uppermost key array 4 for numeral and symbol (or mark) keys, and further a sonant or impure sound mark ([']) key 35 and a p-sound or popped mark ([°]) key 36 are also separately allocated. In FIG. 1, for facilitating recognition of fingers' home positions for finger operation descriptions of kana mark at the keys of the central row of the middle key array 3 are omitted.

In the 109 Japanese keyboard 1 "kana input" method, which an operator inputs a Japanese phrase or sentence in Japanese syllable so-called "yomi" in "kana" mode before electronically transforming into a significative string of characters including a mixture of Chinese characters (kanji) and kana characters, occasionally needs a mode-changing operation between "kana" mode and "alphanumeric" mode, and upon inputting a sonant or p-sound mark needs 2-stroke action which the operator sequentially depresses firstly a certain pure kana key and then secondly a sonant mark ([']) key 35 or p-sound mark ([°]) key 36.

Further in the 109 Japanese keyboard 1, the uppermost key array 4, which is far away from fingers' home positions for finger operation at the middle key array 3, is allocated with kana letters so that it is difficult to exactly touch-type the kana keys of the uppermost key array 4 without sight of the keyboard.

Furthermore input of the Japanese punctuation marks, namely "o" and ".", is necessary to depress either of little fingers' SHIFT-keys 6 or 7 located at both right and left ends of the middle key array 3 and then to depress the punctuation allocated keys 37 and 38 ([>/.] and [</,] keys in alphanumeric mode, respectively) while keeping the depression of the either of little fingers' shift-keys 6 or 7 (2-stroke action).

Due to such troublesome manipulation, those who input in "kana input" method on the JIS keyboard are in the minority, and it is the present situation that many people make do with "Roman letters input" method. This "Roman letters input" method is such a method that a Japanese phrase or sentence in syllable so-called "yomi" is input by spelling with Roman letters' description and then electronically transformed into a significative string of characters including a mixture of Chinese characters (kanji) and kana characters. In such a "Roman letters input" method it will do to basically learn the key-arrangement of twenty-six keys of alphabet letters and several keys of special character or symbol (or mark) keys, and is easy to do touch-typing. Further separate sequential depression of the sonant mark key or p-sound mark key is unnecessary, and sequential depression in little finger's operation using either of SHIFT keys 6 or 7 for Japanese punctuation marks is also unnecessary (that is, one stroke action will do).

The Roman letters input method, however, requires "2-stroke action", that is basically sequential depression of a consonant key (for example, 'k', 's', 't', 'n', 'h', 'm', 'y', 'r', 'w', 'g', 'j', ..., or 'p') and a vowel key (that is 'a', 'i', 'u', 'e', or 'o'), so that it requires the number of key depressions about 2 times as large as kana input method. Further The Roman letters input method has such a defect that Roman letters' spelling different from original English spelling must be input when inputting a word of foreign origin inscribed in katakana, so that it makes a person feel a sense of incongruity or bewilderment.

The JIS keyboard has a keyboard layout of JISX6002 information processing system, but it is, as mentioned the above, diverted from the key-layout of the KANAMOJI typewriter which was designed in the old time when there was no electronic information processing apparatus such as a word processor and a personal computer, nor the Japanese kana-kanji transformation system which is a software or program for electronically transforming a string of inputted "yomi" in kana into a string of characters including a mixture of kanji (Chinese characters) and kana (the Japanese syllabary), so that it was the time when it was quite out of consideration that "yomi" in kana could be inputted in Roman letters and electronically transformed into a string of characters including a mixture of kanji and kana.

Thus the JIS keyboard requires the number of keys corresponding to fifty sounds of the Japanese syllabary so that the keys in the uppermost key array 4 for numerals and symbols (or marks) are, as mentioned the above, also used for allocation of kana characters, and requires the number of keys in the middle key array 3 more than that of a mechanical European languages' typewriter so that the ENTER/RETURN key 9 and the right little finger's SHIFT key 7 are located far away from the key 39 at the right little finger's home position ([+/;] key in the alphanumeric mode).

In the JIS keyboard for IBM's PC/AT compatible machines and Apple's Macintosh now widely used in Japan many people make do with Roman letters input method because of easy learning and operation though the double number of key depressions should be executed. Further because in personal computers, in which the Japanese kana-kanji transformation system (so-called FEP, IME, or IM) can be operated, input of a string of Japanese characters can be executed by Roman letters input method which uses the alphabet, the 104 generic or English keyboard 2 (refer to FIG. 2) is also used in inputting a string of Japanese characters at the personal computers such as PC/AT compatible machines and Macintosh.

Further there is, as shown in FIG. 3, a NICOLA (NIhongonyuryoku COnsortium LAyout) keyboard 1A which is based on the keyboard optionally adapted to Fujitsu's Japanese word processors for word processing only. After analyzing the Japanese sentences this keyboard is determined to allocate "kana" only to the three (the upper, the central, and the lower) rows of the middle key array 3 and enables to input, in only one stroke action, all of pure sound letters, sonant letters, p-sound letters, Japanese punctuation marks, numerals, and symbols (or marks) by single key-depression or by simultaneous key-depression along with either of the right or left THUMB-SHIFT key.

This NICOLA keyboard is developed for electronic Japanese word processing by considering the frequency of the Japanese syllabary appearance in Japanese sentences so that it is superior in kana-input efficiency than the JIS keyboard, the kana key-arrangement of which was diverted from that of the mechanical KANAMOJI typewriter designed about seventy years ago or about half a century before the advent of the electronic information processing apparatus. In fact only keys corresponding to eight fingers' home positions of right and left hands other than right and left thumbs in the central row of the middle key array 3 can input letters of 60% among the Japanese sentences. Further its alphanumeric key-arrangement is the same as that of ASCII layout except a few symbol keys so that it enables the Roman letters input without any sense of incongruity.

Further in order to improve or sophisticate primitiveness of the kana key-arrangement of the JISX6002 model which was diverted from the KANAMOJI typewriter designed about seventy years ago in Japan so that it had never considered the Japanese kana-kanji transformation system, the Japanese input keyboard layout JISX6004 specialized to the Japanese kana-kanji transformation system, so-called new JIS keyboard, is settled in 1986, which followed the example of the Fujitsu's THUMB-SHIFT keyboard in that kana letters were allocated only to three (the upper, the central, and the lower) rows of the middle key array of alphanumeric key-arrangement based on "ASCII" and not allocated to the numeral keys in the uppermost key array, and it was put on the market along with the above mentioned old JIS keyboard of JISX6002 model in about the middle and the latter half of 1980's.

However, in this new JIS keyboard not the "thumbs", but the "little fingers" are used for kana-shifting of each key, and its shifting operation is not one-stroke action by simultaneous depression, but 2-stroke action by sequential depression.

Further the kana key-arrangement of the new JIS keyboard is different from that of the THUMB-SHIFT keyboard so that because of the users' mentality that it is troublesome to learn the new kana key-arrangement and that as long as the Roman letters input is executed even the old JIS keyboard of JISX6002 model is the same way, it was not supported by users, almost disappeared from the market by 1990 and repealed from the Japanese Industrial Standard in 1999.

To the contrary the NICOLA keyboard, which was diverted from the THUMB-SHIFT keyboard developed around 1979 and adapted to the Japanese word processor presented in 1980 by Fujitsu Ltd. The NICOLA keyboards supplied by Fujitsu Ltd. and Reudo Co. Ltd. in Japan are applicable to IBM's PC/AT compatible machines, and still now in 1999 firmly supported by those engaged in writing works such as authors, scenario writers and the like, or the people in general who prize its tireless and efficient kana input. One of the NICOLA keyboards made by Reudo Co. Ltd. can be applied to the recent Apple's Macintosh.

Although M's System keyboard and TRON keyboard are also proposed in Japan, these keyboard are different in the alphanumeric key-arrangement from that of the ASCII layout, so that these keyboard are not further discussed herein for the purpose of simplicity.

As mentioned the above, both of the 109 Japanese keyboard 1 (refer to FIG. 1) and the 104 English keyboard 2 (refer to FIG. 2) are based on the mechanical European languages' typewriter which was made at the time when there was no electronic information processing apparatus, such as a word-processor and a personal computer capable of electronically inputting characters or letters.

The mechanical European language's typewriter and the electronic European language's keyboard as an electronic inputting device of a computer are inputting tools in the region of languages which after every word a blank is inserted or frequency in use of the SPACE key is very high, so that the SPACE key is an important key and thus the SPACE key 8 laterally and widely extends far beyond the range of the thumbs' home positions for finger operation in the lowermost key array 5.

To the contrary "RETURN" operation is not high in the frequency in use as much as "SPACE" input operation and the mechanical typewriter has a problem of its mechanism, so that the RETURN key 9 is located at the extreme right end region of the upper and central rows of the middle key array 3 (in case of 106/109 Japanese keyboard) or at the extreme right end region of the central row of the middle key array 3 (in case of 101/104 English keyboard), which is out of fingers' home positions.

Thus even the ENTER/RETURN key 9 of the character input keyboard in for computers still follows the position of the RETURN key for returning the "carriage" of the mechanical typewriter to a line head at the left end of a typing paper though there is no problem of mechanism as of the mechanical typewriter.

However, in addition to the "RETURN" operation in writing or line feed operation, the frequency of "ENTER" operation for sending execution commands to CPU is also high in computers, and importance of "ENTER" operation is increased more than the times of mechanical typewriters for writings only. Even under such a present circumstance the ENTER/RETURN key 9 of the computer keyboard is still located at a position out of fingers' home positions as of the mechanical typewriter for writings only.

Such an arrangement might not be so much suitable to the current electronic information processing apparatus. That is, the ENTER/RETURN 9 key must be depressed in fingers' operation of touch-typing with the right little finger being stretched in the right direction from its home position, or the right hand being moved in the right direction so that it imposes a burden on the awkward right little finger, and it imposes a mental stress on the operator to precisely depress the ENTER/RETURN key without sight of the keyboard.

On the other hand the sentences of the languages using Chinese characters such as in China, Korea and Japan do not employ a blank between the adjacent words, so that the frequency in use of the SPACE key 8 for a blank is not so high. However, in the advanced Japanese kana-kanji transformation systems such as ATOK (the registered trademark of JUSTSYSTEM Corp.) and MS-IME (the trademark of Microsoft Co. Ltd.) "TRANSFORM" operation for electronically transforming "yomi" in kana into a character string of the mixture including kanji (Chinese characters) and kana letters is imposed on the SPACE key 8, and "NON-TRANSFORM/DEFINED" operation for defining "yomi" in kana as "hiragana" (kana-letters) without transformation or for defining the transformed character string is imposed on the ENTER/RETURN key 9.

Thus in case of inputting the Japanese language by using the main current kana-kanji transformation system such as ATOK, MS-IME and so on frequency of use for both of the SPACE key 8 and the ENTER/RETURN key 9 are very high because they are cooperatively and alternately depressed as walking by both legs.

The 109 Japanese keyboard 1 nevertheless follows in the step of the key-layout of mechanical European languages' typewriter which think much of only a space key so that only the SPACE key 8 widely occupies the central portion of the lowermost key array 5 which is the thumbs' home positions and the ENTER/RETURN key 9 is still located at the position far away form fingers' home positions for finger operation.

Further the 109 Japanese keyboard as shown in FIG. 1 still retains the NON-TRANSFORMATION key 10 and the TRANSFORMATION key 11 which are not so much necessary in the advanced Japanese kana-kanji transformation system for personal computers such as ATOK, MS-IME and so on as were necessary in the old Japanese kana-kanji transformation system before appearance of ATOK or MS-IME, just like the cecum which is unnecessary in an advanced human body, said NON-TRANSFORMATION key 10 and said TRANSFORMATION key 11 remaining at the right and left side positions of the relatively long SPACE key 8 at the central region of the lowermost key array 5, respectively.

Furthermore even in the 109 Japanese keyboard 1 many people make do with the Roman letters input of easy touch-typing rather than kana input as mentioned the above. However, in order to touch-type in the Roman letters input the 104 English keyboard is much more advantageous than the 109 Japanese keyboard. This is because in the 104 English keyboard the ENTER/RETURN key 9 and the right little finger's SHIFT key 7 are in the vicinity of the right little finger's home position for finger operation, whereby upon drawing up the English writings and inputting the mark keys using the SHIFT key the burden to the right little finger becomes light.

Furthermore in regard to equipment for a note-size personal computer or a mobile computer, which is required to be more compact the 104 English keyboard 2 is much more convenient than the 109 Japanese keyboard 1.

In any case touch-typing in both of 109 Japanese keyboard 1 for PC/AT compatible machines and 104 English keyboard 2 is necessary to carry out "ENTER/RETURN" operation at the position of the ENTER/RETURN key 9 where the operator must stretch the right little finger in the right direction or move the right hand in the right direction, and to carry out "NON-TRANSFORMATION/DEFINED" operation by means of this ENTER/RETURN key 9.

Touch-typing the ENTER/RETURN key 9 at the extreme right end of the middle key array 3 with the right little finger awkward in movement imposes a burden on the right little finger and causes a cramp in the right little finger.

In the same way, with respect to the BACKSPACE (BS) key 12 the both of the conventional 109 Japanese keyboard 1 and 104 English keyboard 2 as an input device for electronic information processing apparatus follow in the step of the mechanical European languages' typewriter in spite of no problem about the mechanism as an electronic keyboard as well as the ENTER/RETURN key 9, in which the BACKSPACE (BS) key 12 is located in the extreme right end in the uppermost key array 4.

Touch-typing the BACKSPACE key 12 at the extreme right end of the lowermost key array with the awkward right little finger is much more difficult than depressing the ENTER/RETURN key 9, and imposes a heavier burden on the right little finger and causes a cramp in the right little finger.

Such an arrangement at the right end of the ENTER/RETURN key 9 and BACKSPACE key 12 in the conventional keyboard is not preferable in health and in labor medical science as a human-machine interface in a personal computer from the point of view of ergonomics, especially for women and children who have little hands.

Further there is such a situation that "ENTER" operation by means of keyboard is required because a left-click action is not available during the mouse operation, in which the "ENTER" operation must be executed by the left hand of the operator if the right hand operating the mouse is not released therefrom for "ENTER" operation. However, in the conventional arrangement at the extreme right end of ENTER/RETURN key 9 the left hand must be moved in a long distance across the body, which forces an immoderate posture to oppress the chest.

Furthermore frequent left-click actions are likely to injure the muscle and/or the tendon for the mouse handling index finger so that "ENTER" operation by means of keyboard is more preferable than that by left click action for a mouse.

In case of the NICOLA keyboard the BACKSPACE (reverse) key 12 is located at the position adjacent to the right little finger's home position, while the RETURN key and the SPACE key are both located in the positions out of the fingers' home positions for finger operation because its primary object is in improvement of the Japanese kana input efficiency, especially the RETURN key is far away from the right little finger's home position and small, which is a disadvantage that a burden is imposed on the right little finger for "ENTER/RETURN" operation upon use with a computer.

SUMMARY OF THE INVENTION

A general object of the invention is to provide a character input keyboard, in which the ENTER key can be depressed at the thumb's home positions for finger operation directly by the respective thumb as a character input device for an electronic information processing apparatus with the frequency of "ENTER" operation being higher than that of "RETURN" operation, which touch-typing can more easily be executed without any strain, and which is the most suitable for a note-size personal computer and a mobile computer required to be compact.

Another object of the invention is to provide a character input keyboard which can comfortably draw up both of the English writings and the Roman letters inputted Japanese writings by means of the 101/104 English keyboard superior to the 106/109 Japanese keyboard in operability, and to provide a character input keyboard which can execute information processing and languages' processing at every country in the world more easier only with the 101/104 English keyboard having a long history and an actual result except minor alteration to the traditional key-arrangement.

A further object of the invention is to provide a character input keyboard, which can easily execute "ENTER" operation during the mouse operation by the vacant left hand without releasing the mouse and being in an immoderate posture.

These and other objects, are achieved by a character input keyboard according to the invention, which is characterized in that said keyboard is provided with a pair of right and left front keys centrally juxtaposed in the lowermost key array at the front and the middle of the operator, said front keys being located so as to be directly depressed by the respective thumbs rested at thumbs' home positions of finger operation, respectively, one of the centrally juxtaposed right and left front keys being allocated to a front ENTER/RETURN key and the other to a SPACE key as a normal state of the keyboard, whereby direct ENTER/RETURN operation by either of thumbs rested at thumbs' home positions is physically possible.

The character input keyboard according to the invention can be said that the conventional long SPACE key as of the typical mechanical typewriter, on which both of the right and left thumbs should be rested as their home positions for finger operation, is physically divided into two segments, and one of the divided SPACE key segments normally functions as an ENTER/RETURN key and the other as a SPACE key.

According to the invention, with such an arrangement "ENTER/RETURN" operation, and especially "ENTER" operation of high importance and high frequency of use in an electronic information processing apparatus can easily be executed without the awkward right little finger being stretched or the right hand being moved to the ENTER/RETURN key at the extreme right end of the middle key array out of the fingers' home positions for finger operation. The character input keyboard according to the invention can be so-called a "FRONT ENTER" keyboard or an "ENTER FRONT" keyboard because "ENTER" operation is executed near the side of or in front of the operator.

According to a preferred embodiment of the invention the character input keyboard can be optionally selected before actual use by an operator which of the right and left front keys to be allocated to a front ENTER/RETURN key and a SPACE key, or whether both of the right and left front keys to a SPACE key.

However, in the advanced Japanese kana-kanji transformation system such as ATOK, MS-IME and the like "NON-TRANSFORMATION/DEFINED" operation is imposed on the ENTER/RETURN key, and "TRANSFORMATION" operation is imposed on the SPACE key, so that it is preferable to allocate the left front key to a front ENTER/RETURN key and the right front key to a SPACE key in a normal or default state. This state is mated with the key-arrangement of the "NON-TRANSFORMATION" and "TRANSFORMATION" keys in the Japanese word processor for word processing only, so that it can give the same operational feeling as that of the Japanese word processor for word processing only, and it can left footprints of the Japanese sentences having a mixture of kanji characters and kana letters by cooperatively and alternately depressing those keys just like walking by both of the right and the left legs.

Furthermore with this arrangement during mouse operation "ENTER" operation can be directly executed by the left thumb at the left thumb's home position without the mouse-handling right hand being released from the mouse and without the left hand being moved across in front of the body to the conventional "ENTER/RETURN" key at the extreme right end to execute "ENTER" operation with a constrained posture.

In another preferred embodiment of the invention the character input keyboard is based on a 101/104 English keyboard except that it is provided with said pair of centrally juxtaposed right and left front keys and either of said front keys is allocated to a front ENTER/RETURN key.

Especially this embodiment, the key-arrangement of which is based on the 101/104 English keyboard, is superior to the 106/109 Japanese keyboard in drawing up the English writings and the Japanese writings by means of the Roman letters input method in the advanced Japanese kana-kanji transformation system. In addition, the 106/109 Japanese keyboard is only a local standard limited in Japan, while the 101/104 English keyboard is a defacto world standard.

Furthermore the physical arrangement, which a pair of front keys depressed by the respective thumbs are juxtaposed on the thumbs' home positions for finger operation in the lowermost key array at the front and the middle of said operator, give a physical foundation to realize the shifting logic of one-stroke simultaneous depression in the NICOLA keyboard excellent in kana inputting efficiency by intervening a program or software of a keyboard driver or a NICOLA emulation program or software allowing combined use of the pair of the right and left front keys also as a right and a left THUMB-SHIFT keys, whereby only by the slightly altered 101/104 English keyboard, in which one of the front keys is allocated to the "ENTER/RETURN" key, the English writings and the Japanese writings by means of the Roman letters input and by kana input in the NICOLA style can be drawn up more comfortably than the 106/109 Japanese keyboard.

In the newspaper of YOMIURI SINBUN dated Feb. 20, 1999, such an article about the international research announcement (announced on Feb. 19, 1999) of a working group leaded by the National Japanese Language Laboratory was printed; "The Japanese language is ranked in the third next to the English and the French as a language for communication among various countries expected to be required in the future."

In view of such recent circumstances that recognition for the Japanese language is increased in countries other than Japan and people of all foreign countries can communicate with each other by E-mail through the Internet, a "Front-Enter" style keyboard according to the invention based on 101/104 English keyboard might be most suitable if people in the countries other than Japan should input the Japanese language by keyboards based on 101/104 English keyboard available in their own country. It is because although in a normal 101/104 English keyboard of non "Front Enter" style is also possible to input the Japanese language in the Roman letters input method, the people in the countries other than Japan would have a resistive feeling against inputting the Japanese language by the Roman letters input method. It forces the people in the countries other than Japan into a wasteful effort to learn the "Roman letters spelling" method, so that they would think direct "kana" input is more natural and efficient than the "Roman letters" input. Then the "kana" input of a NICOLA manner can be executed by sticking letter-labels or seals of NICOLA kana key-arrangement on the keys of the 101/104 English keyboard. the NICOLA's kana key-arrangement can be fitted in the key-layout of the 101/104 English keyboard. In this case the keyboard should, however, be the 101/104 English keyboard of Front Enter style according to the invention if the shifting logic of simultaneous depression by one-stroke action is applied thereto along with intervention of an emulation software.

Further in another preferred embodiment according to the invention the existing ENTER/RETURN key at the extreme right end of the upper and/or central row in the middle key-array is replaced by a BACKSPACE key and/or other operational key or symbol keys of high frequency of use. Such an arrangement further improves its operability.

BRIEF DESCRIPTION OF THE DRAWINGS

The invention will now be described in more detail in some embodiments with reference to the accompanying drawings, in which

FIG. 1 is a prior art illustration for the conventional 109 Japanese keyboard of JIS kana key-arrangement for IBM's PC/AT compatible machine;

FIG. 2 is a prior art illustration for the conventional 104 English keyboard;

FIG. 3 is a prior art illustration for the NICOLA keyboard;

FIG. 4 is an illustration for the character input keyboard according to the invention based on the 104 English keyboard, and (a) is a preferred embodiment with coexistence of the conventional "ENTER/RETURN" key, (b) is another preferred embodiment, in which "BACKSPACE" key is located at the position for the conventional "ENTER/RETURN" key and "DELETE" key at the position for the conventional "BACKSPACE" key; and FIG. 5 is an illustration for a further preferred embodiment of the character input keyboard according to the invention based on the 109 Japanese keyboard of JIS kana key-arrangement.

The same reference numerals as in FIGS. 1 to 3 are used for equivalent parts in FIGS. 4 and 5, where possible.

PREFERRED EMBODIMENTS OF THE INVENTION

Figure 1:
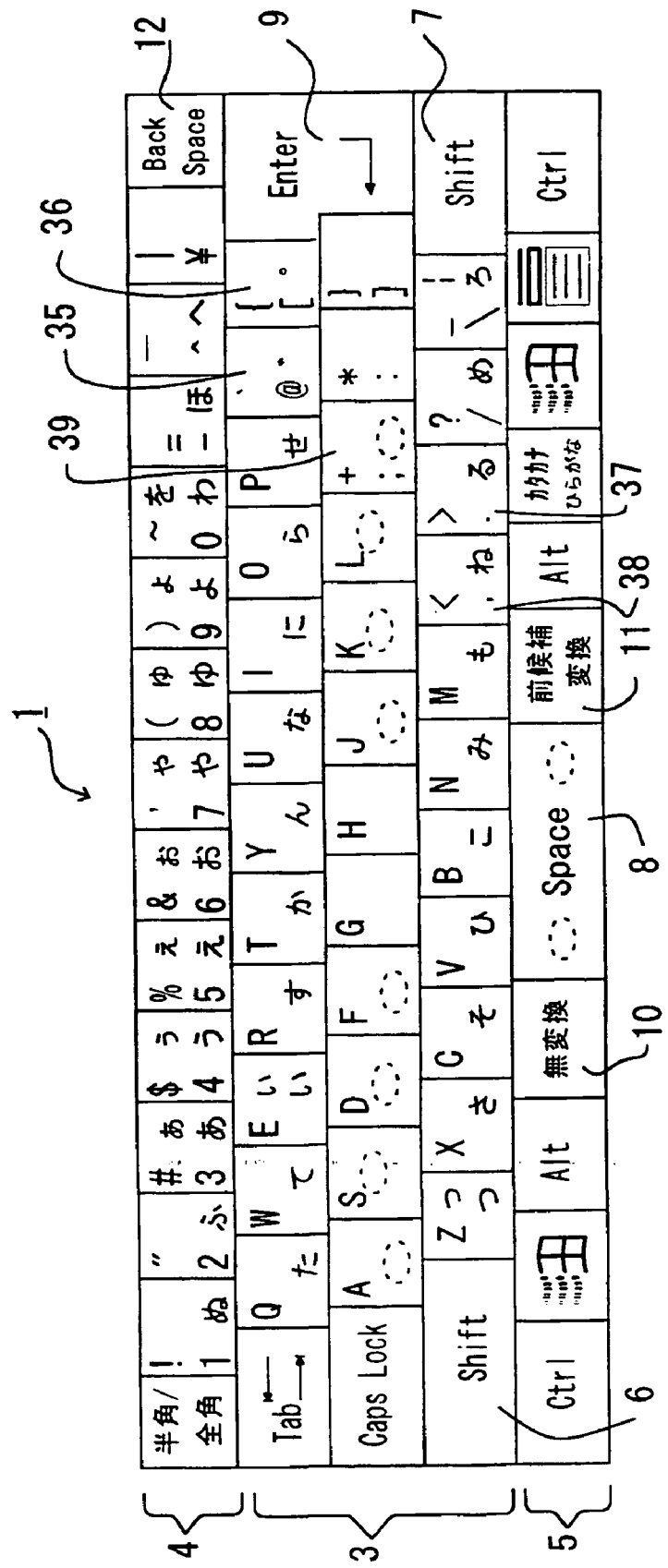
FIGS. 1 to 3 illustrate the prior art described above.
Figure 2:
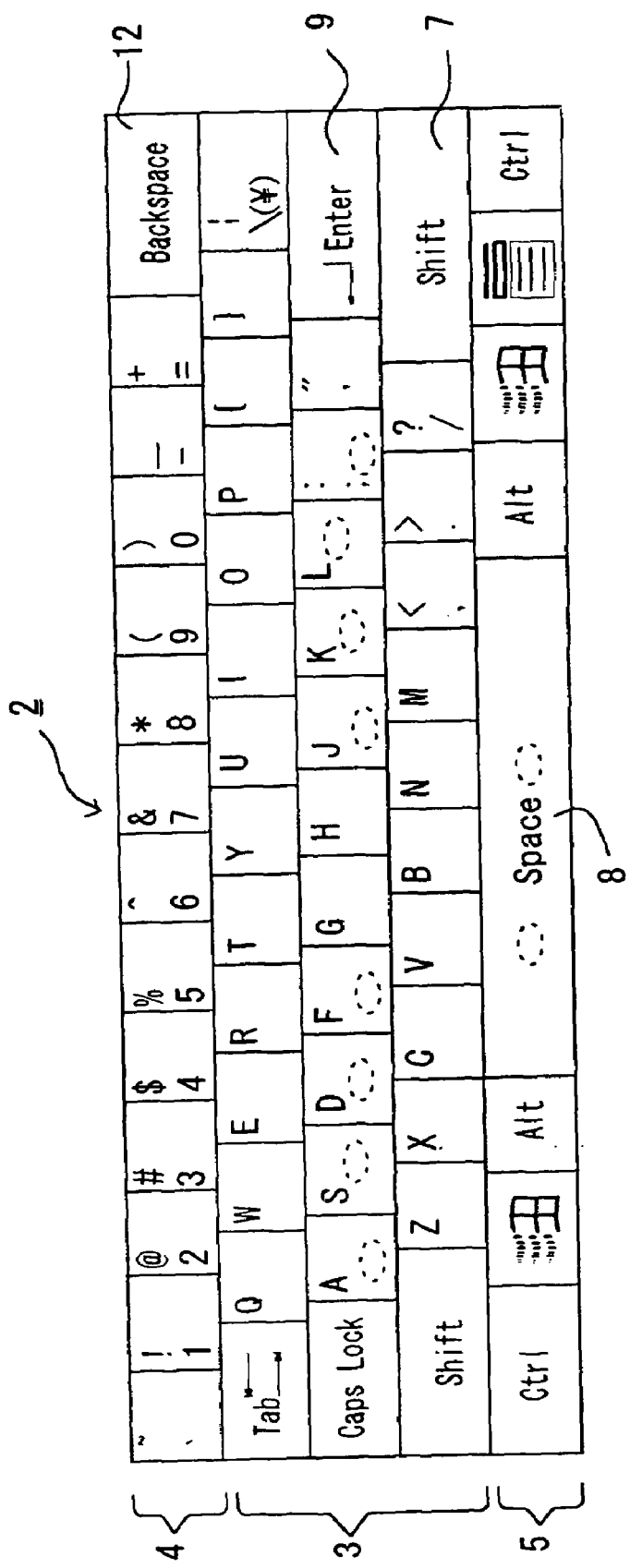
Figure 3:
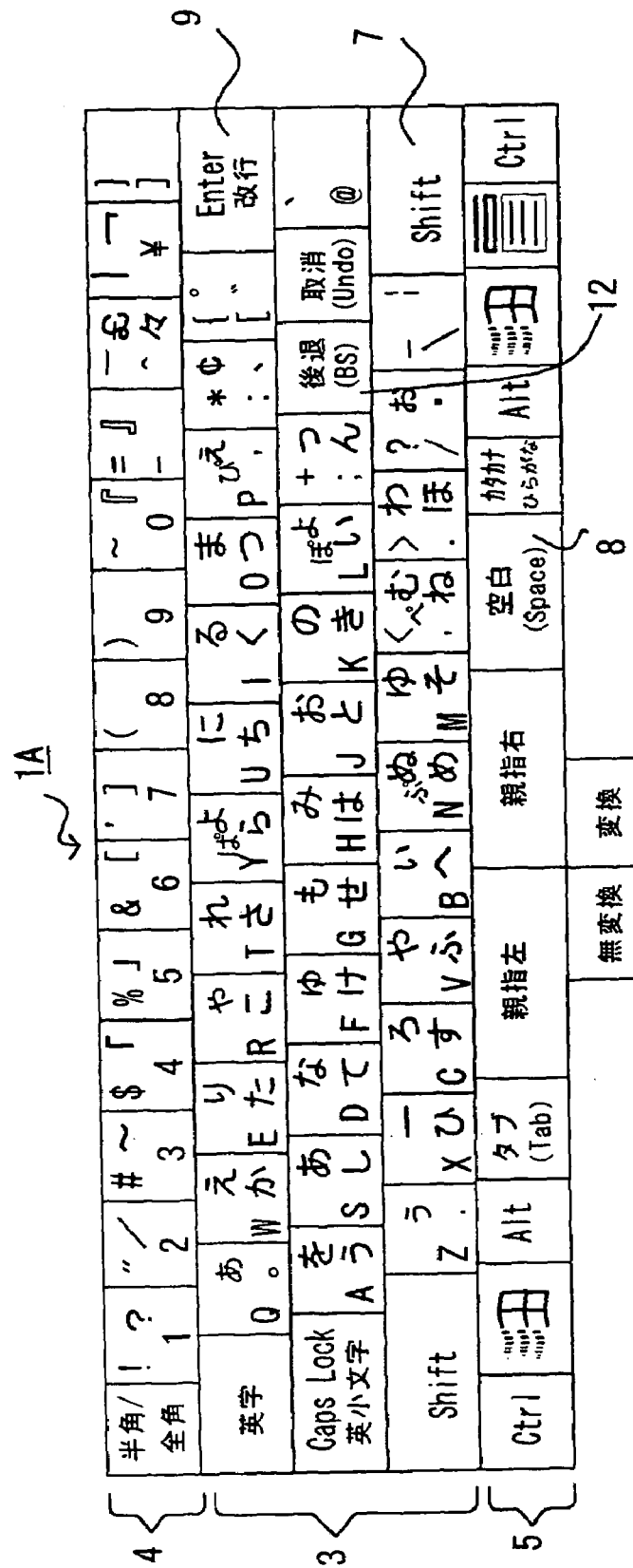
Figure 4:
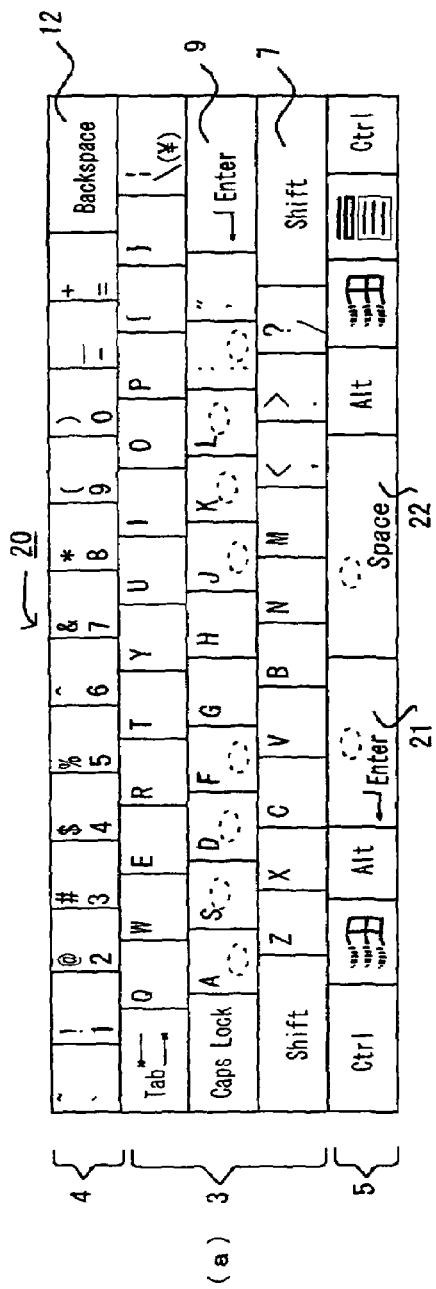
FIGS. 4 and 5 illustrate the invention.
Figure 4:
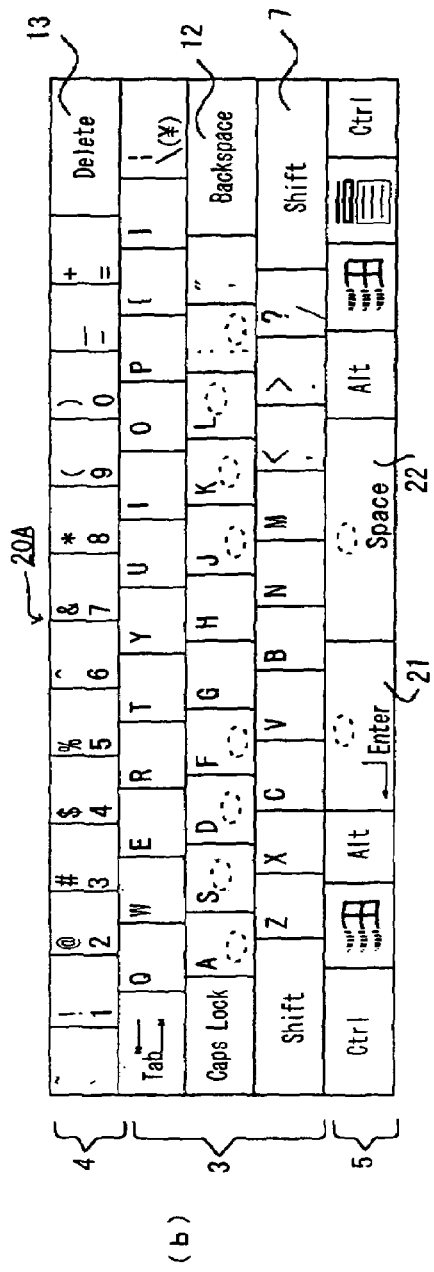

FIG. 4 (a) shows a preferred embodiment of the FRONT-ENTER or ENTER-FRONT style character input keyboard according to the invention. The character input keyboard 20 as shown in FIG. 4 is provided with a pair of a right and a left front keys 21, 22 at the right and the left thumbs' home positions for finger operation, which can directly or only be depressed by the respective thumbs rested thereon as their home positions In other word it can be said that the conventional SPACE key, which has occupied the central and long area, is divided into two segments.

In the preferred embodiment of the invention as shown in FIG. 4 (a) the keyboard is substantially the same as the normal 104 English keyboard except that the left SPACE key segment or the left front key 21 is allocated to "front ENTER/RETURN" key, and the right SPACE key segment or the right front key 22 to "SPACE" key, and the normal ENTER/RETURN key 9 at the extreme right end of the middle key array 3 can be also used at the same time so that it can be accepted without a sense or incongruity even to those who are accustomed to the normal 104 English keyboard.

According to this embodiment of the invention "ENTER/RETURN" operation can easily be executed by means of the respective thumb at its home position for finger operation, and it will be unnecessary to depress the conventional ENTER/RETURN key 9 by stretching the awkward right little finger thereto.

Furthermore according to the character input keyboard of this embodiment "ENTER" operation can be executed during mouse operation by the right hand without releasing the right hand from the mouse and without the other left hand in free moving across the body of operator for depressing the conventional ENTER/RETURN key 9 at the extreme right end of the middle key array 3 so as to oppress the chest, but with direct depression by means of the left thumb at its home position.

It is preferable that the character input keyboard can be optionally selected before actual use by an operator which of the right and left front keys to be allocated to a front ENTER/RETURN key and a SPACE key, or whether both of the right and left front keys to a SPACE key.

In the case that either of the front keys is allocated to an ENTER/RETURN key it is further preferable that the character input keyboard can be intervened with key-layout program or software so as to alter the function of the ENTER/RETURN key at the extreme right end of the middle key array by setting up into another operational key having a high frequency of use, for example a BACKSPACE (BS) key 12, a DELETE(DEL) key 13, or the like, or another symbol key.

In addition to modification in provision with the front ENTER key as shown in FIG. 4(a) a character input keyboard 20A as shown FIG. 4(b) is actually (normally) provided with the BACKSPACE(BS) key 12 at the right end position of the middle key array for the conventional ENTER/RETURN key 9 and actually (normally) with DELETE(DEL) key 13 at the position for the conventional BACKSPACE key in the uppermost key array 4. According to this embodiment "BACKSPACE" operation can easily be executed without stretching and moving the right little finger and the right hand to the extreme right end of the uppermost key array 4 furthest from the right little finger's home position for finger operation.

Figure 5:
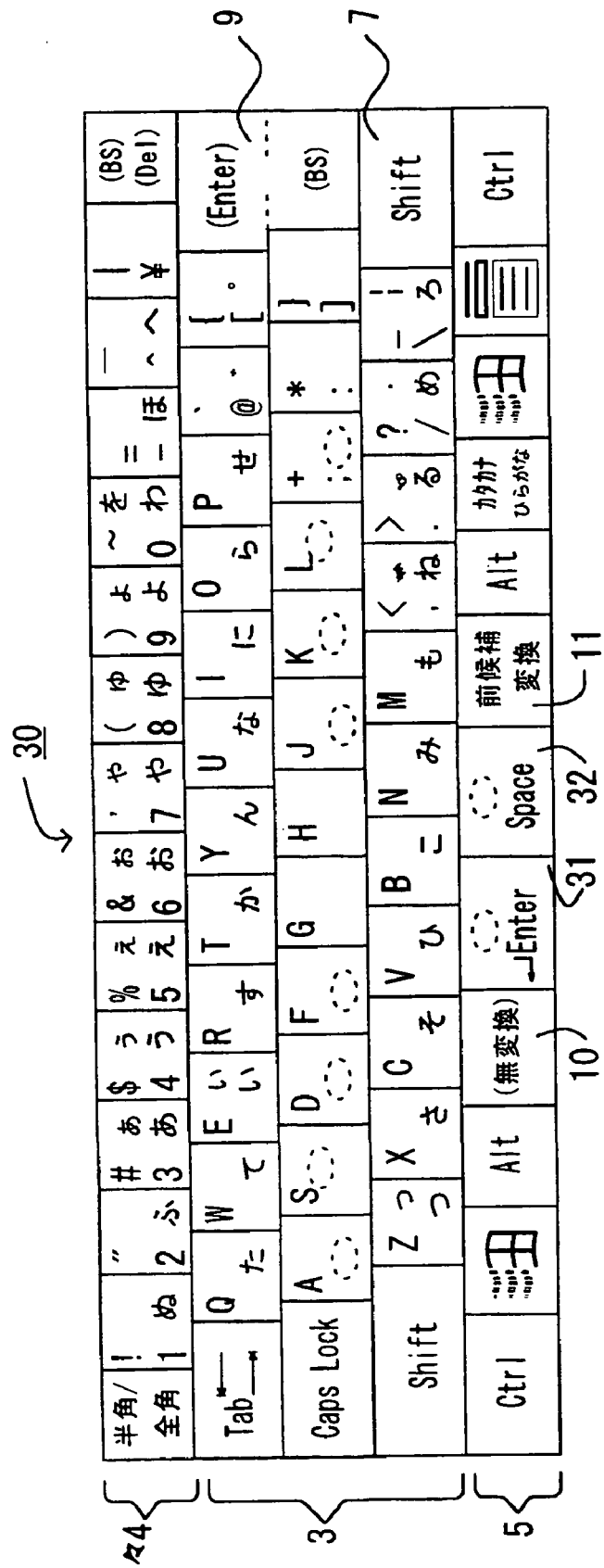

FIG. 5 shows another preferred embodiment according to the invention, in which the character input keyboard 30 is provided with a pair of front keys 31, 32, said front keys 31, 32 depressible by the respective right and left thumbs at their home positions for finger operation.

In this embodiment the keyboard 30 is substantially the same as the conventional 109 Japanese keyboard 1 except that the left SPACE segment or the left front key 31 is allocated to the "front ENTER/RETURN" key and the right SPACE key segment or right front key 32 to the "SPACE" key, the normal ENTER/RETURN key 9 at the extreme right end of the middle key array 3 can be also used at the same time so that it can be accepted without a sense or incongruity even to those who are accustomed to the conventional JIS keyboard.

In this embodiment based on the 109 Japanese keyboard it is further preferable that the character input keyboard can be intervened with key-layout software so as to alter the function of the NON-TRANSFORMATION key 10 and the TRANSFORMATION key 11 into another operational key having a high frequency of use, for example enabling to function as the BACKSPACE(BS) key and the DELETE (DEL) key by setting up.

Furthermore in a modified embodiment for the embodiment as shown FIG. 5, though not shown in the drawing, the keyboard is actually (normally) provided with other operational keys at the positions of the normal ENTER/RETURN key 9 at the extreme right end in the middle key array 3 and of the normal BACKSPACE key 12, respectively.

Although the present invention has been fully described by way of example in connection with the preferred embodiments based on the conventional 104 English keyboard or 109 Japanese keyboard as shown in the drawings, it is to be noted that various changes and modifications are apparent to those skilled in the art. The present invention can be applied also to all character input keyboard of other styles used in electronic information processing apparatus.

For example a separated or foldable keyboard, in which a pair of the right and left front keys functioning as an ENTER/RETURN key and a SPACE key are included in the right and the left halves thereof, respectively, is also in the spirit and scope of the invention.

INDUSTRIAL APPLICABILITY

The invention is applicable to all kinds of existing keyboards in the world as long as a pair of right and left front keys are centrally juxtaposed at the front and the middle of said operator so as to be directly depressed by the respective thumbs rested at thumbs' home positions for finger operation, respectively, one of the right and left front keys being allocated to a front ENTER/RETURN key and the other to a SPACE key as a normal state of the keyboard.

Such an arrangement according to the invention gives rise to an advantage that not only as a "RETURN" key, but also as an "ENTER" key, which is high frequency of use in electronic information processing apparatus, direct and easy enter/return operation by either of thumbs rested at thumbs' home positions is physically possible. Such an "ENTER" operation by the respective thumb at its home position for finger operation is much easier and more comfortable than by the right little finger and by a left-click action by means of the mouse handling index finger. This gives an enormous benefit to people in the whole world.

TV game's controllers of Nintendo, Sony and the like are all manipulated almost by the right and left thumbs. This is because a thumb is most active and strong of five fingers. Therefore a character input keyboard according to the invention capable of efficiently making the best of the right and left thumbs is very reasonable and effective.

To the contrary in the prior conventional keyboards, and even in prior ergonomically designed keyboards the ENTER/RETURN key is not located at the home position for either of the right and the left thumbs so that a user can not make the best of the right and the left thumbs because either of the right or left thumb is used mainly for depressing a SPACE key thereof.

Further according to the invention a front ENTER/RETURN key and a SPACE key are juxtaposed at the right and left thumbs' home positions, so that it gives rise to another advantage that the "NON-TRANSFORMATION" and the "TRANSFORMATION" operations are effectively executed in the advanced Japanese kana-kanji transformation system such as ATOK, MS-IME and the like, in which the "NON-TRANSFORMATION" and the "TRANSFORMATION" keys can be substituted by the "ENTER/RETURN" key and the "SPACE" key, respectively.

Moreover according to the invention by a pair of the right and left front keys depressed by thumbs and juxtaposed in front and at the central of an operator, it grants a physical foundation under intervention of keyboard driver software or emulation software for similarly actuating as if it is a NICOLA keyboard which is superior in the Japanese kana input efficiency, so that it gives rise to a further advantage that the right and the left front keys can be used not only as the front ENTER/RETURN key and the SPACE key, but also as the right and the left THUMB-SHIFT keys, and an effective kana input is possible according to a shifting logic of simultaneous depression by one-stroke action in the NICOLA keyboard like chord depression on the piano keyboard.

Further, the invention could be applied to, if any, the keyboards in the other countries rather than Japan, in which letters of different kinds are allocated to alphanumeric keys and it requires shifting operation by the right and the left thumbs for their own languages just like the NICOLA keyboard. In view of such a way to efficiently utilize the limited number of keys, any operating system for electronic information processing apparatus, for example WindowsXX, Linux and so on should be able to use the front ENTER key and the SPACE key also as the shifting keys manipulated by the right and the left thumbs without any interference in operation.

Furthermore an electronic information processing apparatus has no limitation to the mechanism as of the conventional mechanical European languages' typewriter and no necessity to follows in the steps of the operational key-arrangement in this mechanical European languages' typewriter, so that by juxtaposition of the front ENTER/RETURN key and the SPACE key in front and the center of an operator the conventional "ENTER/RETURN" key can be replaced by other operational keys or symbol keys having high frequency of use and thus the whole keyboard can be compact and more increased in its operability. It is very advantageous for note-size personal computers or mobile computers having a full and practical keyboard.

Further from a medical point of view it is proved according to the statistics that frequent use of thumbs would prevent senile dementia. Therefore, the character input keyboard according to the invention would be useful for preventing the senile dementia because it makes the most of the right and the left thumbs to depress the front ENTER/RETURN key and the SPACE key.

The invention claimed is:

1. A character input keyboard, comprising a key layout corresponding to a 101/104 English keyboard or a 106/109 Japanese keyboard adapted to include:

a lowermost key array having a pair of left and right keys centrally juxtaposed in respective home positions for left and right thumbs of a user, one of said left and right keys being an ENTER/RETURN key and the other one of said left and right keys being a SPACE key, said respective home positions for the left and right thumbs being horizontally aligned with each other in said lowermost key array;

a middle character key array having an extreme right key being a BACKSPACE key; and an uppermost numerical/symbol character key array having an extreme right key being a DELETE key, said ENTER/RETURN key, said SPACE key, said BACKSPACE key, and said DELETE key being a normal state of said keyboard without any key reassignment.

2. A character input keyboard according to claim 1, wherein said left key of said lowermost key array is said ENTER/RETURN key, and said right key of said lowermost key array is said SPACE key.

3. A character input keyboard according to claim 1, wherein in the key array groups, from the uppermost key array to the lowermost key array, concerned with only character keys including a SPACE key.

* * * * *